(12) United States Patent
Heffernan, Jr. et al.

(10) Patent No.: US 10,010,890 B2
(45) Date of Patent: Jul. 3, 2018

(54) DOCUMENT DESTRUCTION SYSTEM AND METHODS

(71) Applicant: ORGANIC WASTE MANAGEMENT, LLC, North Andover, MA (US)

(72) Inventors: Robert F. Heffernan, Jr., West Newbury, MA (US); Robert F. Heffernan, III, North Chelmsford, MA (US)

(73) Assignee: ORGANIC WASTE MANAGEMENT, LLC, North Andover, MA (US)

( * ) Notice: Subject to any disclaimer, the term of this patent is extended or adjusted under 35 U.S.C. 154(b) by 471 days.

(21) Appl. No.: 14/609,041

(22) Filed: Jan. 29, 2015

(65) Prior Publication Data

US 2015/0314299 A1 Nov. 5, 2015

Related U.S. Application Data

(60) Provisional application No. 61/933,105, filed on Jan. 29, 2014.

(51) Int. Cl.
*B02C 25/00* (2006.01)
*B02C 18/00* (2006.01)
*H04N 5/232* (2006.01)
*B02C 23/00* (2006.01)
*G06Q 10/00* (2012.01)
*G06Q 10/10* (2012.01)

(52) U.S. Cl.
CPC .......... *B02C 18/0007* (2013.01); *B02C 23/00* (2013.01); *B02C 25/00* (2013.01); *G06Q 10/10* (2013.01); *G06Q 10/30* (2013.01); *H04N 5/23229* (2013.01); *Y02W 90/20* (2015.05)

(58) Field of Classification Search
CPC ........ G06Q 10/10; G06Q 10/30; B02C 23/00; B02C 18/0007; H04N 5/23229; Y02W 90/20
See application file for complete search history.

(56) References Cited

U.S. PATENT DOCUMENTS

| | | | |
|---|---|---|---|
| 2007/0063082 A1* | 3/2007 | Coleman | B02C 18/0007 241/101.2 |
| 2007/0080249 A1* | 4/2007 | Hamasuna | B02C 18/0007 241/36 |
| 2014/0208965 A1* | 7/2014 | Noblitt | F23G 7/003 100/99 |

* cited by examiner

*Primary Examiner* — Faye Francis
(74) *Attorney, Agent, or Firm* — Preti Flaherty Beliveau & Pachios LLP

(57) ABSTRACT

The invention provides a system and method for processing at least one document thereby rendering the document illegible; and recording an information summary associated with the document and the processing of the document.

9 Claims, 6 Drawing Sheets

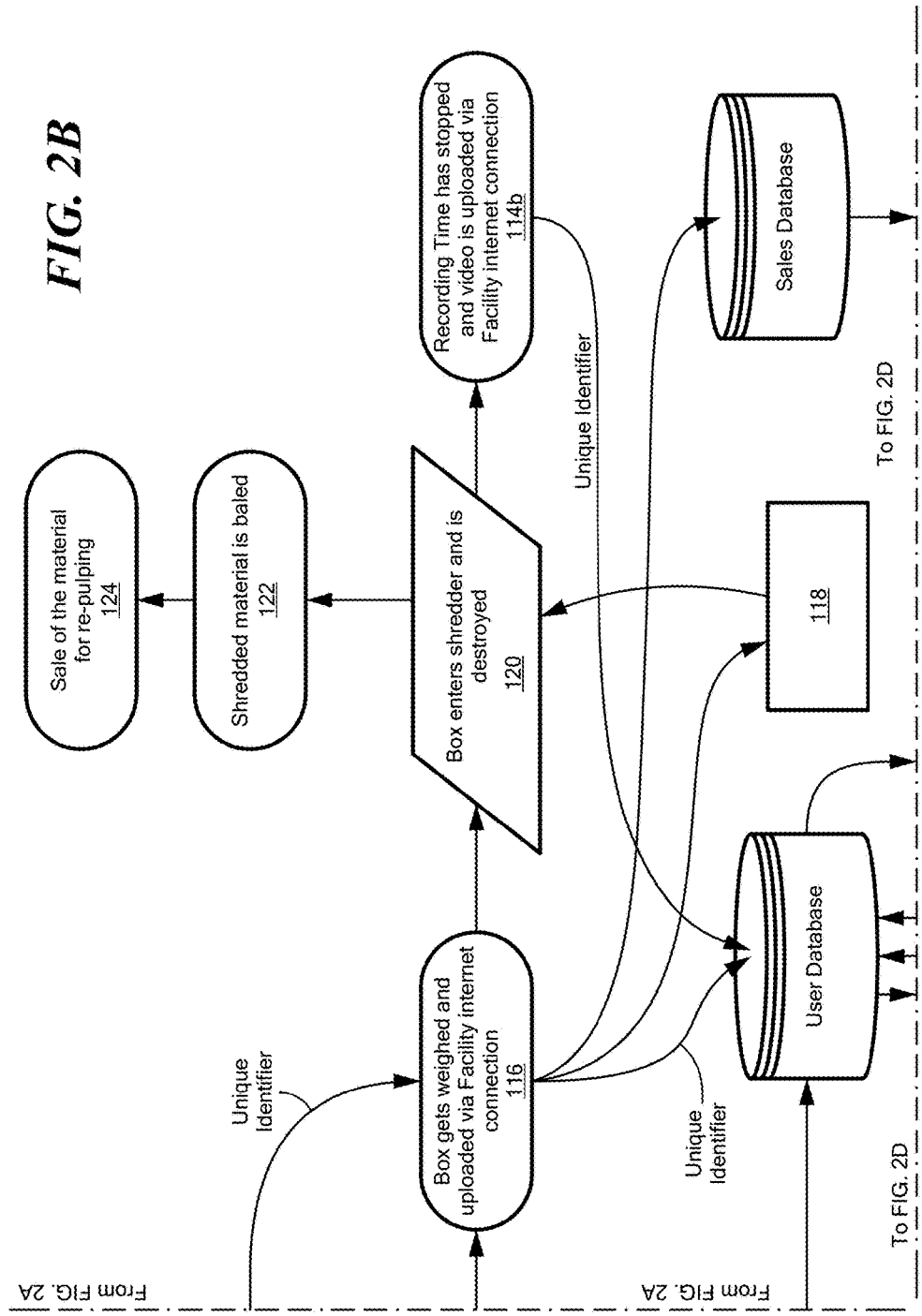

DOCUMENT DESTRUCTION SYSTEM AND METHODS

STATEMENT REGARDING FEDERALLY SPONSORED RESEARCH OR DEVELOPMENT

N/A

BACKGROUND OF THE INVENTION

The present invention relates to systems and methods for recording destruction of sensitive materials for homes, small businesses, and the like.

For small businesses and individuals, it can be expensive to hire a company to come out to their location and shred documents. Site arrival fees, in addition to a price per pound, often makes this service not cost effective. Additionally, it can be inconvenient, from a time management standpoint, to hire such companies to visit their location.

One alternative is to purchase a shredder for destroying sensitive documents. These devices, however, are often cumbersome to operate and limit the amount of input. One other alternative is for physically bringing their sensitive documents to a location for destruction. This, however, can be time consuming and requires the individual to carry all of their documents to this remote location.

Absent personally shredding the documents, the above options often lack the confirmation and peace of mind that the documents have actually been destroyed in a proper manner. Often times, data destroyers will not shred the materials, but, instead, will simply bale it and resell the material to a paper mill for recycling, thus increasing the amount of handling as well as the opportunities for data loss.

As can be seen, there is a need for a system and method for providing a safe and secure destruction of sensitive materials while providing a confirmation of proper destruction.

BRIEF SUMMARY OF THE INVENTION

In one aspect, the invention features a system for document destruction including a document destruction device adapted for processing at least one document thereby rendering the document illegible; and a recording device adapted for recording an information summary associated with the document and the processing of the document.

In one embodiment, the information summary includes a unique identifier associated with the document for processing. In another embodiment, the information summary includes a processing end time.

In yet another embodiment, the recording device is a camera. In a further embodiment, the information includes at least one visual image of the document after processing is completed. In another embodiment, the information summary includes a video of the process from a recording start time to a recording end time.

In another embodiment, the system includes an electronic transmittal device adapted for electronically uploading and transmitting the information summary to a remote user data base. In still another embodiment, the information summary includes an alert indicating that processing of the document is complete.

In one embodiment, the system includes a scanner capable of scanning the unique identifier.

In another embodiment, the system includes a weighing device capable of weighing the document to determine a document weight. In yet another embodiment, the system includes a computation device adapted for determining an optimized processing duration time based upon a comparison of the document weight with a pre-determined correlation of document weight versus processing duration time; and an electronic transmittal device adapted for electronically uploading and transmitting the document weight to the computation device and electronically transmitting the optimized processing duration time back to the document destruction device.

In still another embodiment, the system includes a conveying device capable of receiving the document and continuously transporting the document to and from the document destruction device.

In an addition aspect, the invention features a method for documenting destruction of at least one document. The method includes scanning a unique identifier associated with the document; processing the document thereby rendering the document illegible with a document destruction device; and recording an information summary associated with the document and the processing of the document including the unique identifier.

In one embodiment, the information summary includes a processing end time.

In another embodiment, the recording step includes using a camera.

In still another embodiment, the information summary includes at least one visual image of the document after processing is completed. In a further embodiment, the information summary includes a video of the process from a recording start time to a recording end time.

In one embodiment, the method further includes a step of electronically uploading and transmitting the information summary to a remote user data base.

In another embodiment, the information summary includes an alert indicating that processing of the document is complete.

In an additional embodiment, the method includes weighing the document to determine a document weight prior to processing.

In another embodiment, the method further includes electronically uploading and transmitting the document weight to a computation device; determining an optimized processing duration time based upon a comparison of the document weight with a pre-determined correlation of document weight versus processing duration time; and electronically transmitting the optimized duration time back to the document destruction device for setting of a processing duration for the processing of the document.

In still another embodiment, the method includes continuously transporting the document from receipt of the document to the document destruction device and from the document destruction device.

BRIEF DESCRIPTION OF THE SEVERAL VIEWS OF THE DRAWINGS

The invention will be more fully understood from the following detailed description in conjunction with the drawings, in which:

FIG. 2B is a flow chart showing the method according to an embodiment of the invention;

DETAILED DESCRIPTION OF THE INVENTION

The present invention features a system and methods for document destruction wherein the destruction is recorded and the recorded information is sent to the customer user for confirmation. The recordation can be done, for example, with a camera to provide evidence, as needed, of proper and complete document destruction. The invention's system and methods can be continuous to optimize efficiency and minimize costs. The system and methods can help users, including, for example, individuals and small businesses, minimize cost and inconvenience associated with destroying in-house sensitive materials while simultaneously they can provide users with documentary evidence of complete and proper document destruction.

Figure 1:
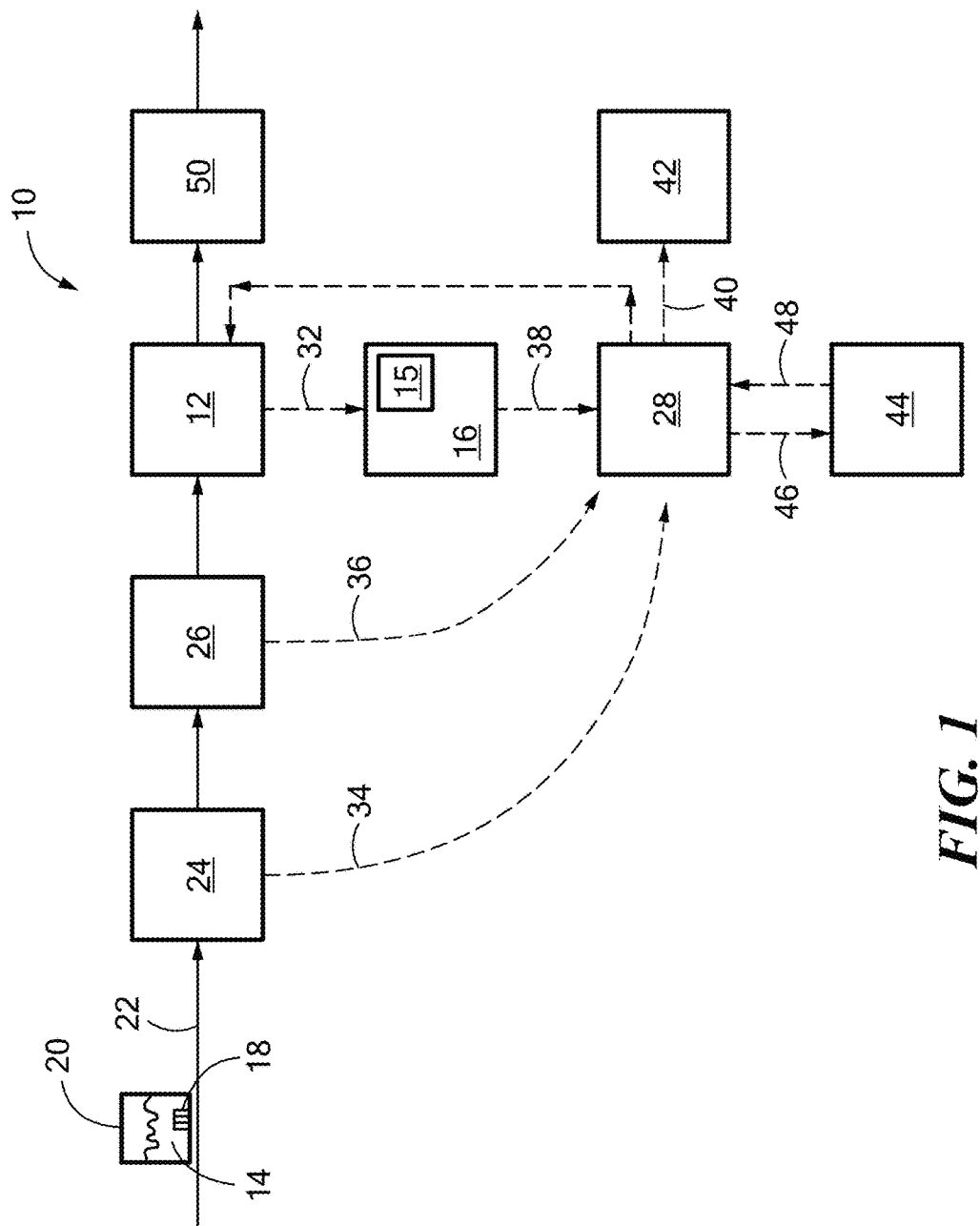
FIG. 1 is a diagrammatic view of the system according to an embodiment of the invention.
Figure 2A:
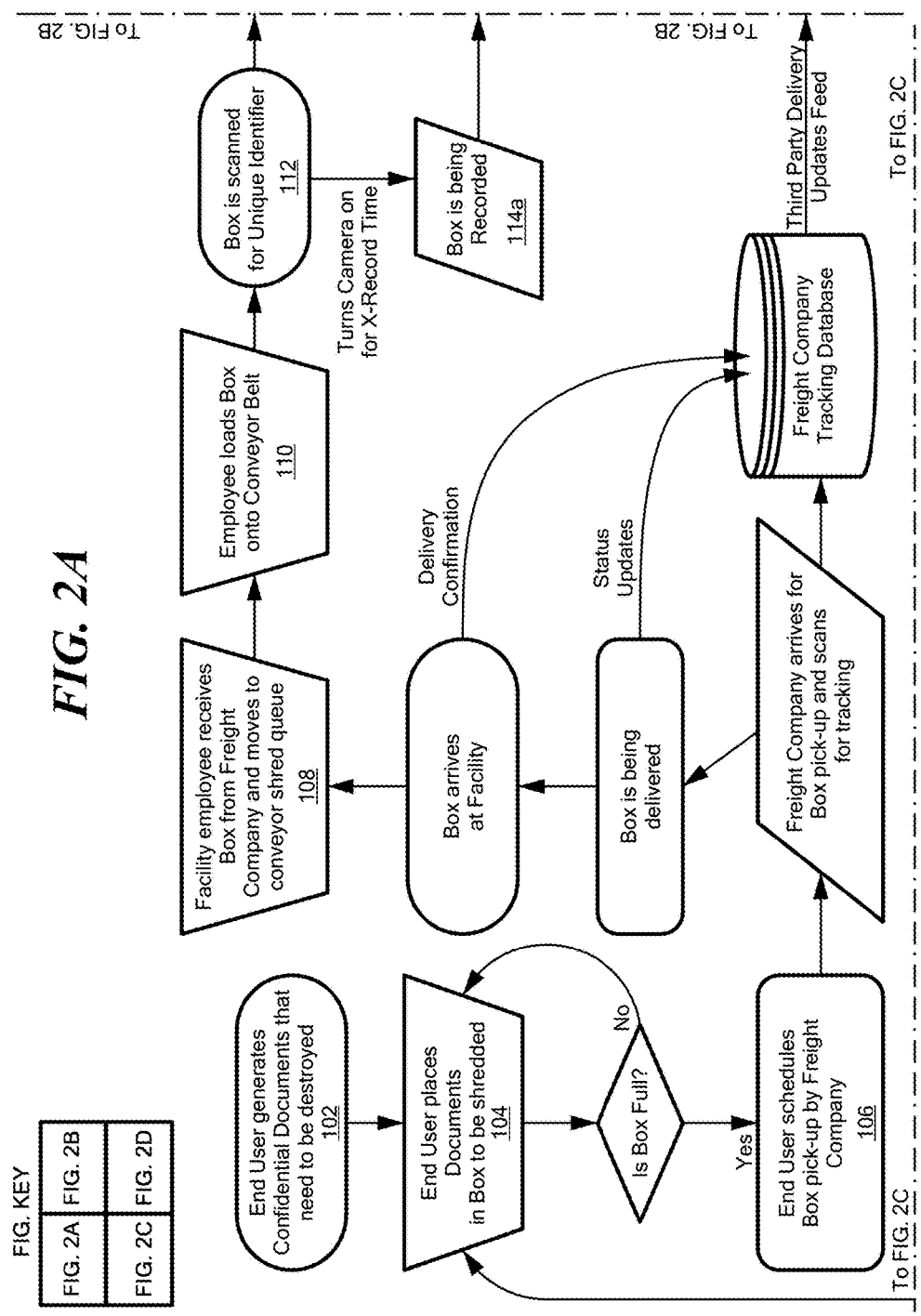
FIG. 2A is a flow chart showing the method according to an embodiment of the invention.
Figure 2C:
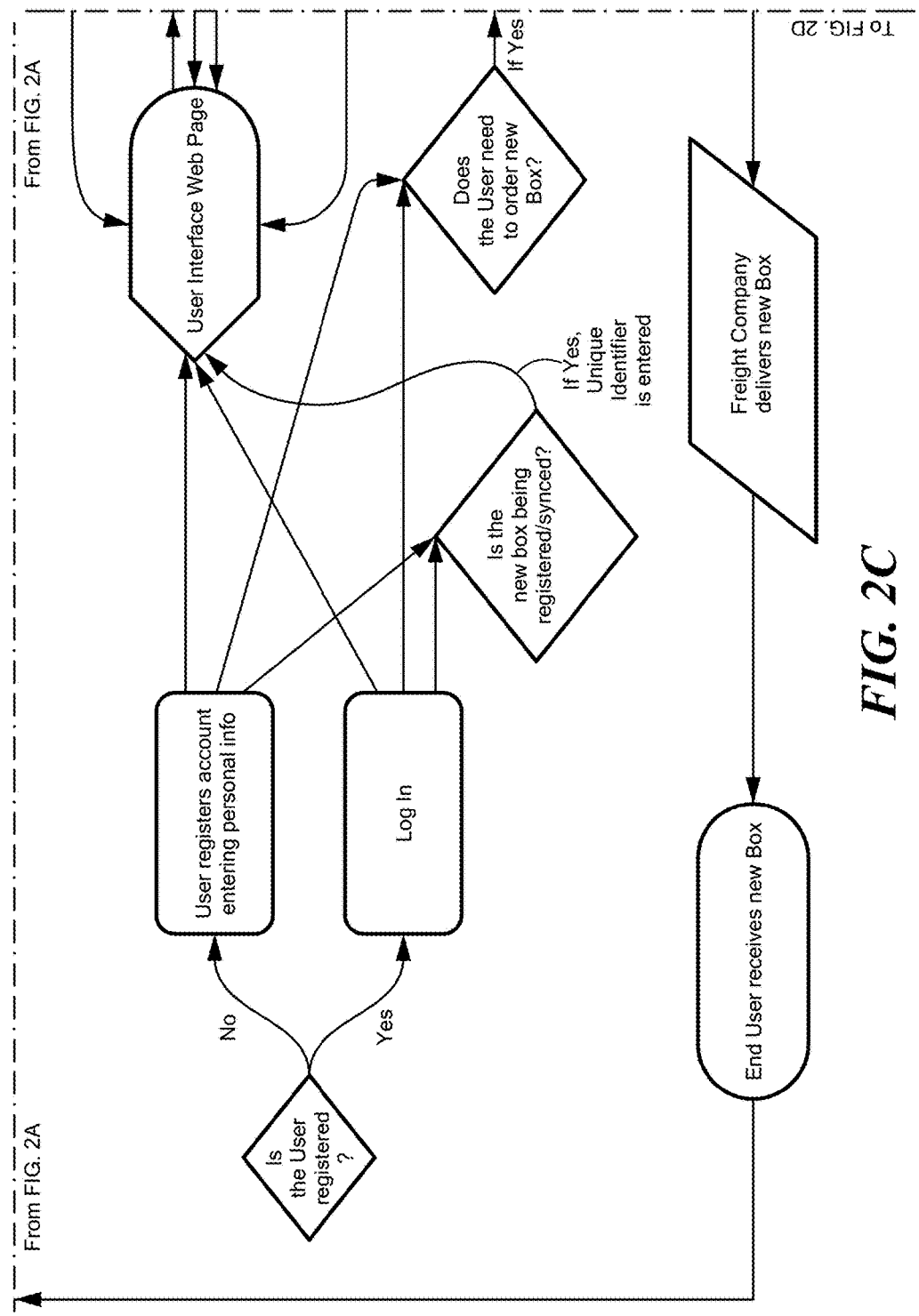
FIG. 2C is a flow chart showing the method according to an embodiment of the invention.
Figure 2D:
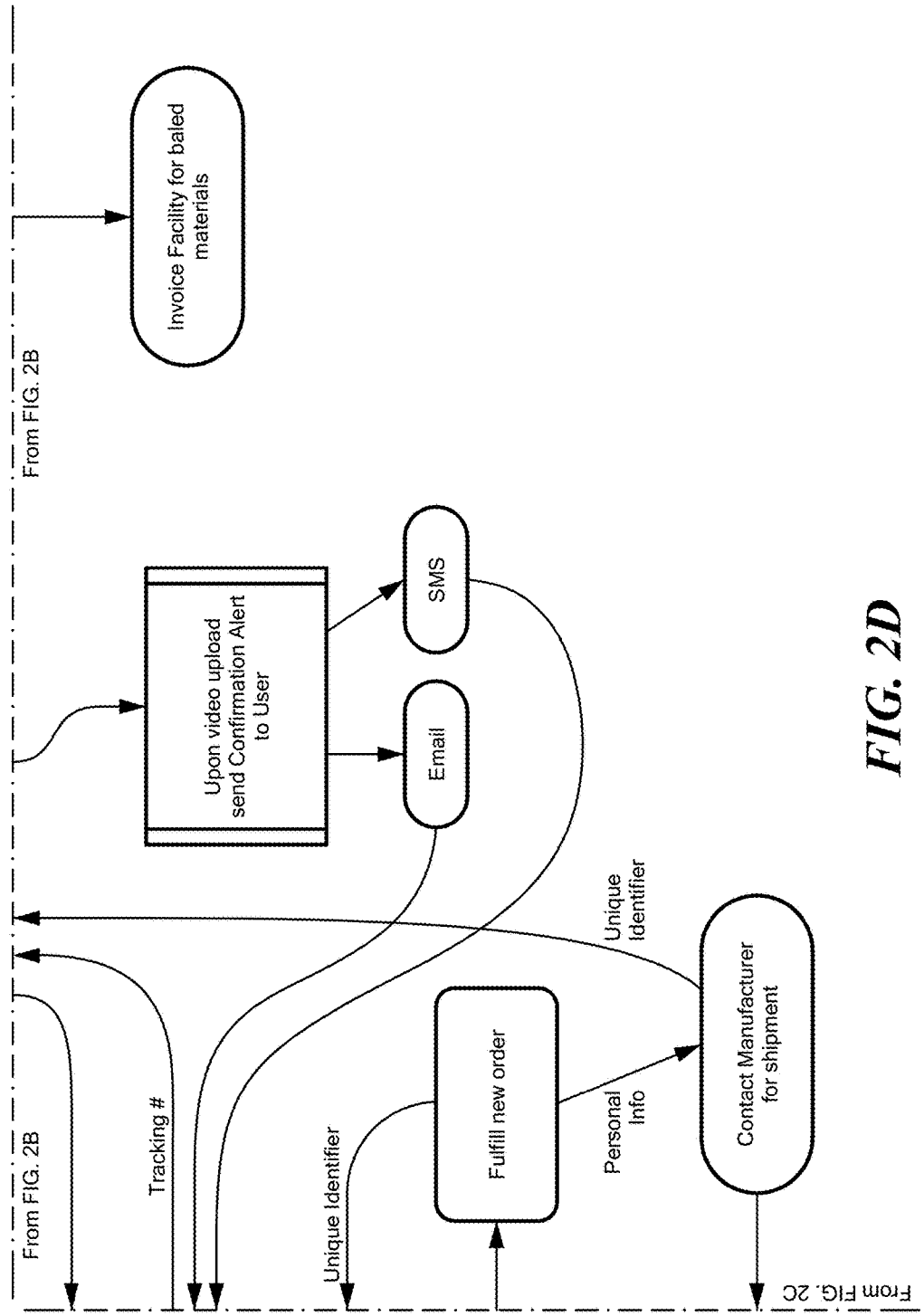
FIG. 2D is a flow chart showing the method according to an embodiment of the invention.

In one aspect, the invention features a system 10 which is shown diagrammatically in FIG. 1. The system includes a document destruction device 12 for processing at least one document 14 thereby rendering the document illegible. For the purposes of the application, the term "document" can include one or a plurality of traditional documents each including a single or a plurality of pages, and/or electronically based material or materials, and/or products designated for destruction and/or a containment device or devices for containing said documents, materials and/or products therein. The system also includes a recording device 16. The recording device 16 is adapted for recording information such as an information summary associated with the document 14 and its' processing.

For example, the information can include a unique identifier 18 associated with the document 14 for processing and/or a containment device 20 in which the document 14 is placed and/or contained. The information can also include processing information 32 including processing start and end times. The processing start and end times can correspond to a time of the user's preference. For non-limiting examples, the processing start time can correspond to the time when the document destruction device starts to operate. The processing end time can correspond to the completion of document processing, such as, for example, document shredding.

In a preferred embodiment, the document destruction device 12 includes a shredder. In other embodiments, other document destruction devices known to those of ordinary skill in the art can be used.

In the illustrated embodiment, the system includes a conveying device 22 capable of continuously receiving a containment device 20 and/or the document 14 for processing and continuously transporting the document 14 to the document destruction device 12. In a preferred embodiment, the conveying device 22 is a conveyor belt. In other embodiments, other conveying devices known to those of ordinary skill in the art can also be used for receiving and transporting the containment device to the document destruction device.

In the illustrated embodiment, the document 14 is contained within a containment device 20 including a box. In other embodiments, the containment device can include a banding device known to those of ordinary skill in the art. An exemplary banding device includes a tape. The containment device 20 can be provided to the customer with the unique identifier 18. Alternatively, the customer can place the unique identifier 18 onto the containment device 20 and/or the document 14 contained therein. For purposes of this application, the term "identifier" includes a bar code, a radio-frequency identification (RFID), and/or other code or codes known to those of ordinary skill in the art for unique identification. The identifier 18 can be correlated to various types of identifying information including, for example, the name and address of the customer, the date or date range the containment device 20 was filled with the document 14, the date or date range of the document 14, and/or a subject matter descriptor for the document 14. The identifier 18 can be coded in such a manner so as to preserve the confidentiality of the customer and/or the document 14 and their subject matter.

In a preferred embodiment, the recording device 16 of the system is a camera. For purposes of the present application, the term "camera" includes a digital camera, a still camera for taking photographs, a video camera for recording video images and optionally audio, a movie camera, a phone camera, and other cameras known to those of ordinary skill in the art for capturing, recording and otherwise stories images and video or film. The recording device can be adapted for recording at least one visual image of document processing. Alternatively, or additionally, the recording device can be capable or recording a video from the start recording time to an end recording time to create evidence of the entire processing of the documents. For the purposes of this invention, the term "video" includes recording, reproducing and/or broadcasting of moving visual images. The start and end recording times can be selected according to user preference. For example, they could correspond to the start and end time of processing wherein the document is rendered illegible, such as, for example, when the document enters and exits the document destruction device. Alternatively, the recording start time can correspond to the time when the document is received by the document destruction provider, the time when the document is queued for document destruction, when the document is loaded onto a conveyor belt, the time when the document is weighed, etc. Analogously, the recording end time can correspond to the time when the packaging of the document for shipping is completed or the time when the document is actually shipped.

In the illustrated embodiment, the system includes a scanning device 24 separate from the recording device 16. The scanning device 24 is of any type known to those of ordinary skill in the art. The scanning device 24 can be adapted for scanning the unique identifier 18 associated with the containment device 20 and/or the document 14. The scanning device 24 can be incorporated into the conveying device 22 and disposed so that the containment device 20 and/or the document 14 passes continuously through the scanning device 24 prior to being continuously transported to the document destruction device 16, as shown in the illustrated embodiment of FIG. 1. The scanning device 24 can further include a portable scanning device for scanning the unique identifier at different points. For non-limiting examples, a portable scanning device can be used to scan the unique identifier at the time the containment device is filled with the document, at the time the document is picked up by either a transporter or the document destruction provider, and/or at the time the document is received at the site of the document destruction provider. In addition, or in lieu of the separate scanning device 24 illustrated in FIG. 1, the recording device 16 can include a scanning component 15 for scanning the unique identifier 18, although this component 15 is not obligatory for the recording device 16.

In the illustrated embodiment of FIG. 1, the system 10 also includes a weighing device 26 for weighing the containment device 20 and/or the document 14 for processing to determine a document weight prior to and/or following document processing. The weighing device 24 can be incorporated into the conveying device 22 such that the containment device 20 and/or the document 14 passes continuously through the weighing device 26 prior to being transported to the document destruction device 16. Alternatively, or in addition to, the conveying device 22 can be adapted such that the containment device and/or the document is routed through the weighing device following processing of the document.

The system can also include an electronic transmittal device 28 adapted for electronically uploading information 38 received from the recording device 16 and optionally, information 34 received from the scanning device 24 and/or information 36 received from the weighing device 26, and electronically transmitting the information 40 to a remote user site 42. The information can include the unique identifier 18, the start and the end times of the document processing, selected still images and/or videos of the document processing, a confirmation alert which confirms the completion of document processing, and/or the weight of the containment device and/or the document either before and/or after processing.

The system 10 can include a computation device 44 for determining an optimized processing duration time based on a comparison of the document weight with a pre-determined correlation of document weight versus processing duration time. The electronic transmittal device described above can then be adapted for electronically uploading and transmitting information 46 including the document weight to the computation device 44 and relaying information 48 including an optimized processing duration time back to the document destruction device 12. The document destruction device 12 can be adapted for manually or preferably, automatically setting the processing duration time based on the determined optimized desired processing duration time. The control of document processing time based on the document amount, that is, the weight of the document for processing, minimizes unnecessary time and energy spend on document processing, thereby optimizing system efficiency.

In the illustrated embodiment of FIG. 1, the system 10 optionally, but not necessarily, can include a packaging device 50 adapted for packaging, baling or otherwise preparing the processed document for off-site shipping to, for example, a recycler.

In another aspect, the invention includes a method 100 for documenting destruction of at least one document, as illustrated in the flow charts of FIG. 2A-2D. A user can purchase or otherwise obtain a containment device from an online or physical retailer. In the exemplary embodiment, the containment device includes a box. Other containment devices known to those of ordinary skill in the art can be used with the invention and will depend upon the type of document contained therein. The containment device can include a return address label and can also include pre-paid postage for sending the containment device for destruction. In some embodiments, a user can use their own containment device; however, certain size and shape limits may be required depending upon application.

The user can generate a document, such as a sensitive document, as shown in step 102, and fill the containment device with the document, as shown in step 104 and, when desired (typically when the box is filled), can send or drop off or schedule pick-up for delivery the containment device, as shown in step 106, to a destruction company for appropriate destruction. The user can receive updates from the shipping company when the containment device is picked-up, moved through the shipping system, and delivered. The destruction company may also send the user a confirmation of receipt of the containment device.

When the destruction company receives the containment device, as shown in step 108, they can load the containment device onto a conveyor belt, as shown in step 110, and can register the identifier, as previously described herein. The identifier can correspond to information specific to the user, the document, the processing of the document, and/or other information, as desired, by the user. For a non-limiting example, the registration of the identifier can be accomplished by scanning a code on the containment device and/or document, as shown in step 112. This code can be supplied when the containment device is purchased by a particular user, or can be supplied by the user by application of a sticker, for example, onto the containment device. In other embodiments, the method of the invention can include scanning the containment device using a portable and/or fixed scanning device In the illustrated embodiment, the method includes a step 114 of recording the processing of the document and information about the document, as desired. The recording step can include using a camera. The camera can be used to record still images and/or a video of the processing. The recording start and end times can be selected according to user preference. In non-limiting examples, the recording can start when the document is received, loaded on the conveyor, scanned, weighed, or submitted to the document destruction device for processing. For other non-limiting examples, the recording can end when the document exits the document destruction device, the document is packaged, or when the document is shipped to another facility. In an exemplary embodiment, FIG. 2 illustrates initiating recording in step 114(a) prior to the step of weighing the document and terminating recording in step 114(b) following the processing of the document.

Either before the recording step 114 (a) is initiated or after the recording step 114 (a) is initiated, the method can include weighing the box to determine a document weight, as shown in step 116. Preferably, the weighing occurs after recording has been initiated so that this step can be documented and included in the information summary related to the processing of the document. The method can then include the step of electronically uploading and transmitting with an electronic transmittal device the weight of the document and/or the containment device to a user database and also, or alternatively, to a computation device. Alternatively, or in addition to the step of weighing the document before processing, the method can include the step of weighing the document after processing. The method can then include the step of electronically uploading and transmitting with the electronic transmitting device the post-processed document weight to a user database thereby providing further documentation and verification of the complete processing of the document.

The method can include using the computation device to determine an optimized processing duration time based upon a comparison of the pre-processing document weight with a pre-determined correlation of document weight versus processing time, as shown in step 118. The method further includes electronically transmitting the optimized processing duration time back to the document destruction device. The optimized processing time can then be used to set manually, or preferably, automatically, the duration time for processing. The document weight can also be used to charge the user for the destruction of the document. In some embodiments, a flat fee may be applied for destruction of a box of a particular size.

The method then includes the step of processing the document thereby rending the document illegible with a document destruction device, as shown in step 120. Thus, the box and/or the document contained therein are identified with an account, such as by scanning a bar code, and the destruction is recorded, for example, by video recording. The video recording of the destruction of the box can be then sent to the user, thereby confirming, beyond a doubt, the destruction of the sensitive material in the box.

The processing of the document and possibly the box or other containment device can take place in various methods. Typically, the process rendering the document illegible will be done with a shredder. The user can then see the shredding of their documents on the video they receive from the destruction company.

The method can include the packaging of the processed document, as shown in step 122. The shredded materials can be baled or otherwise packaged for shipping.

The method can include a step 124 shipping the processed document to an off-site facility, such as, for example, a pulping company, wherein the processed document can be used as raw material.

The methods and system of the present invention can include an interface, such as a web-based or application based interface, where the user can track their boxes, view the destruction videos, place orders, pay for orders, order supplies (such as boxes, bar code labels, and the like), store and save videos, and the like.

The entire process, including scanning of the box, optional weighing of the box, shredding of the documents, video recording the shredding process, and updating the user's account with the completion status and uploaded video, can all be accomplished automatically by the system and methods of the present invention.

Figure 3:
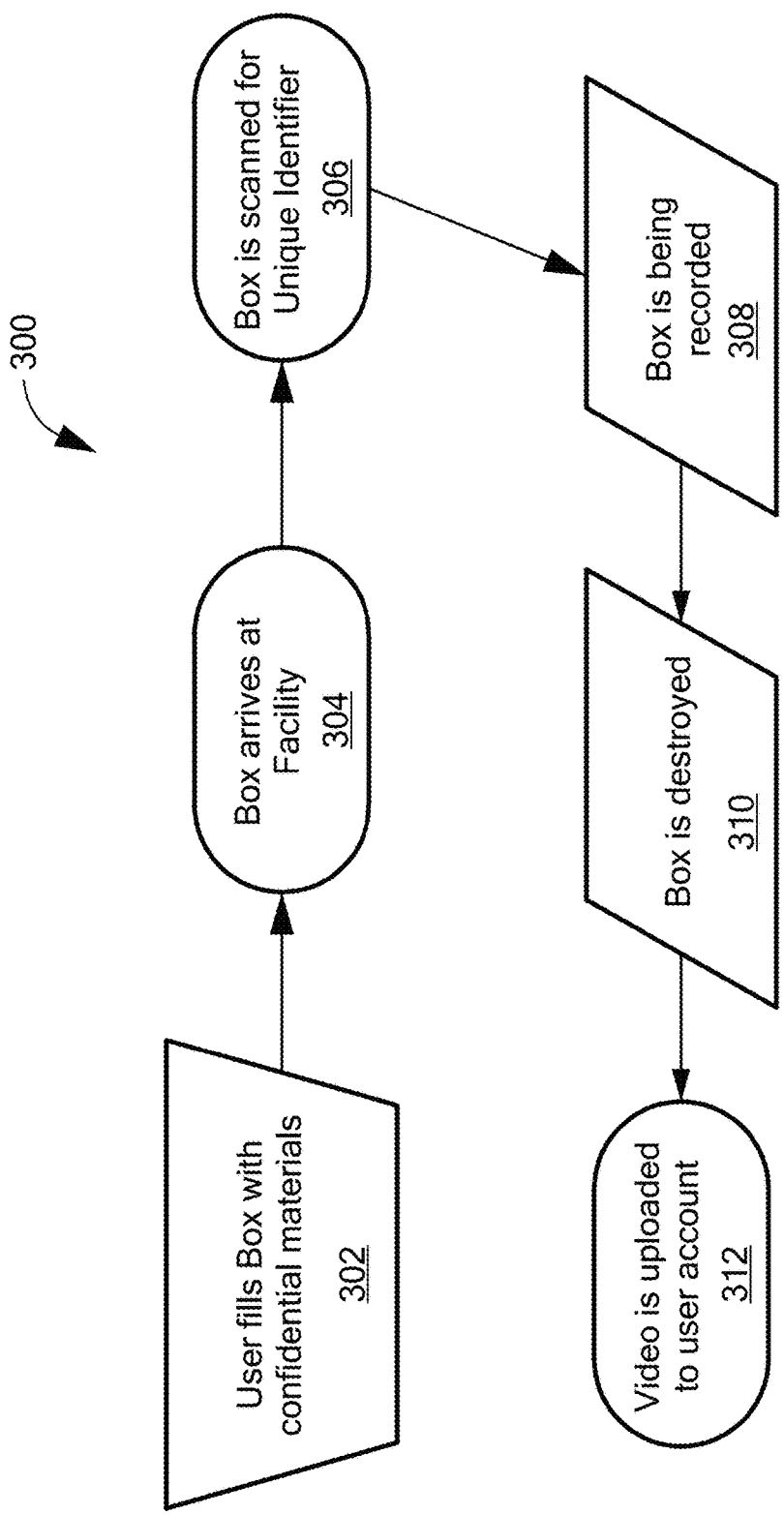
FIG. 3 is a flow chart showing the method according to an embodiment of the invention.

FIG. 3 shows a more stream-lined embodiment of the method of the invention. In this embodiment, the method 300 includes filling a containment device, for a non-limiting example, a box, with at least one document for processing, as shown in step 302. The method further includes transporting the containment device to a facility including a document destruction device, as illustrated in step 304. The method then includes scanning the document and/or the containment device to record a unique identifier associated with the document, as shown in step 306. The method further includes the step of initiating a recording of the document, as shown in step 308. The method then includes the step of processing the document thereby rendering the document illegible, as shown in step 310. In a preferred embodiment, the processing includes destroying the document. Then method then includes the step of terminating the recording and electronically uploading the recording to a user account, as shown in step 312. In a preferred embodiment, the recording includes a video of the processing of the document.

The methods and systems of the present invention can provide an inexpensive and convenient method for the destruction of documents, especially for small businesses and individuals.

The invention is not to be limited to what has been particularly shown and described but is intended to encompass the spirit and true scope of the appended claims.

What is claimed is:

1. A method for documenting destruction of at least one document, the method comprising:
    scanning a unique identifier associated with the document;
    processing the document thereby rendering the document illegible with a document destruction device; and
    recording an information summary associated with the document and the processing of the document including the unique identifier;
    wherein the information summary comprises a video of the process from a recording start time to a recording end time;
    wherein the recording start time is a start time prior to rendering the document illegible selected from the group consisting of a time when the document is received, a time when the document is submitted to the document destruction device for processing, a time when the document is loaded onto a conveying device capable of receiving and transporting the document to and from the document destruction device, a time when the document is scanned, and a time when the document is weighed; and
    wherein the recording end time is selected from an end time following rendering the document illegible selected from the group consisting of a time when the document exits the document destruction device, a time when packaging of the document is completed, and a time when the document is shipped to another facility.

2. The method of claim 1, wherein the information summary comprises a processing end time.

3. The method of claim 1, wherein the recording step includes using a camera.

4. The method of claim 1, wherein the information summary comprises at least one visual image of the document after processing is completed.

5. The method of claim 1, further comprising:
    electronically uploading and transmitting the information summary to a remote user data base.

6. The method of claim 1, wherein the information summary comprises an alert indicating that processing of the document is complete.

7. The method of claim 1, further comprising:
    weighing the document to determine a document weight prior to processing.

8. The method of claim 7, further comprising:
    electronically uploading and transmitting the document weight to a computation device;
    determining an optimized processing duration time based upon a comparison of the document weight with a pre-determined correlation of document weight versus processing duration time; and
    electronically transmitting the optimized duration time back to the document destruction device for setting of a processing duration time for the processing of the document.

9. The method of claim 1, further comprising:
    continuously transporting the document from receipt of the document to the document destruction device and from the document destruction device.

* * * * *